United States Patent
Choi

(10) Patent No.: US 7,003,478 B1
(45) Date of Patent: Feb. 21, 2006

(54) ADVERTISING METHOD USING SOFTWARE PRODUCTS

(76) Inventor: Hyung-sik Choi, 501-602 Geonyoung Apt., Kangsun Maeul, Juyeop-dong Ilsan-gu, Goyang-city, Kyungki-do (KR)

( * ) Notice: Subject to any disclaimer, the term of this patent is extended or adjusted under 35 U.S.C. 154(b) by 531 days.

(21) Appl. No.: 09/507,093

(22) Filed: Feb. 17, 2000

(30) Foreign Application Priority Data

Sep. 27, 1999 (KR) ................................ 1999-41306

(51) Int. Cl.
*G06F 17/60* (2006.01)
(52) U.S. Cl. ..................................................... 705/14
(58) Field of Classification Search ................. 705/14; 709/219; 717/174, 177, 178
See application file for complete search history.

(56) References Cited

U.S. PATENT DOCUMENTS

| | | | |
|---|---|---|---|
| 5,105,184 A | 4/1992 | Pirani et al. ............... 705/14 X |
| 5,305,195 A * | 4/1994 | Murphy .......................... 705/1 |
| 5,781,894 A * | 7/1998 | Petrecca et al. ............... 705/14 |
| 5,848,397 A * | 12/1998 | Marsh et al. .................. 705/14 |
| 5,937,392 A * | 8/1999 | Alberts ........................ 705/14 |
| 5,995,102 A * | 11/1999 | Rosen et al. ................. 345/339 |
| 6,119,098 A * | 9/2000 | Guyot et al. .................. 705/14 |
| 6,202,207 B1 * | 3/2001 | Donohue ..................... 717/11 |
| 6,256,668 B1 * | 7/2001 | Slivka et al. ............... 709/220 |
| 6,285,985 B1 * | 9/2001 | Horstmann ................... 705/14 |
| 6,285,987 B1 * | 9/2001 | Roth et al. ..................... 705/27 |

\* cited by examiner

*Primary Examiner*—Eric B. Stamber

(57) ABSTRACT

An advertising method using software products in which at least one advertisement is inserted so that the software products can be distributed for free or at a low cost. The advertising method comprises the steps of: inserting at least one advertisement into at least one portion of a software program contained in a software product, by support from an advertising sponsor during the making of the software product; making the software program stop in operation during use of the software program when a sponsored advertisement is displayed on a display screen; and resuming the software program only when the sponsored advertisement displayed on the screen is clicked on.

4 Claims, 4 Drawing Sheets

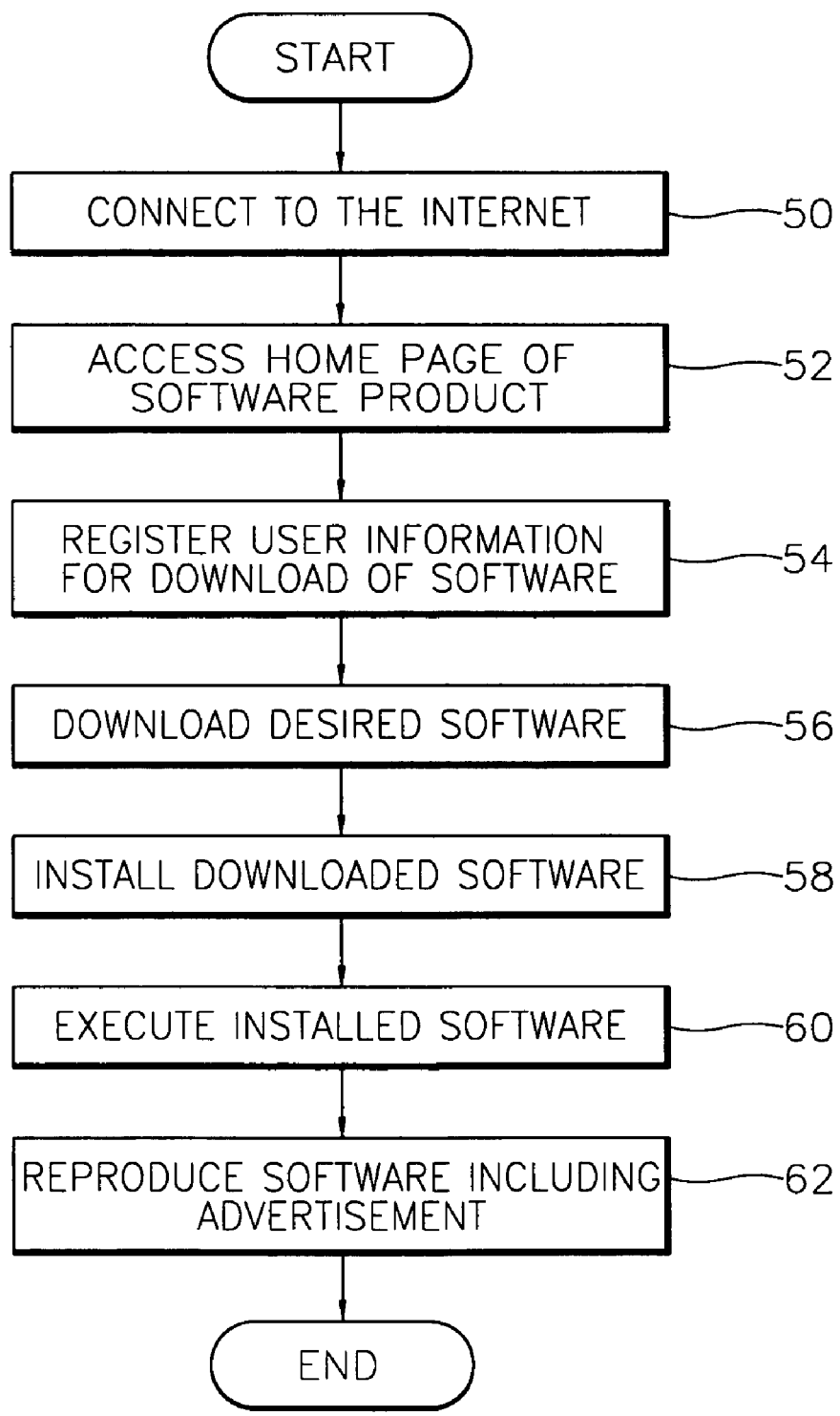

ADVERTISING METHOD USING SOFTWARE PRODUCTS

BACKGROUND OF THE INVENTION

1. Field of the Invention

The present invention relates to an advertising method using software products, and more particularly, to an advertising method using software products in which an advertisement is included in a program of a software product supported by an advertisement sponsor and a user purchases the software products at a low price or for free so that the user watches the advertisement of the sponsor when using the software product, instead of a software developer directly selling the software product to consumers.

2. Description of the Related Art

People in modern society are living in a flood of advertisements. Advertisement sponsors hope that consumers watch their own advertisements, while consumers even think it is a waste of time to watch an advertisement they do not have an interest in. Nevertheless, advertisement sponsors hope that consumers obtain more information about their products from advertisement so that consumers finally choose their products being in competition with rival products in the market.

These days, however, as countless advertisements from mass media such as TV, radio, newspaper or magazine inundate many and unspecified people, much more expenses are involved whereas the efficiency of advertisement is lowered compared to advertisement targeting specified consumers.

Also, people in modern society are living in a flood of various software products. However, programs for limited use and a specialized field normally have a limited number of consumers and thus the price thereof becomes considerably high. Accordingly, much efforts and finances are required to determine and purchase necessary software. Also, vendors of software programs distribute beta-version programs to users for free or at a low price in order to allow their software programs to be tested by users to see if there are any defects or bugs in the software programs, or to allow time for the users to be accustomed to the software programs. However, as such trials are just for the testing of the software programs prior to the official release of products to the market, most people do not seem to want to take part in the beta programs.

For the above reasons, users are reluctant to purchase expensive software programs and feel helpless when they encounter new and better programs when using the purchased programs. Thus, users may be attracted to use an illegally copied version of the programs. Also, from the perspective of the program developers, there will be less desire to develop and improve programs.

To solve these problems that can occur in the advertisement and software industries, a new method should be searched for.

SUMMARY OF THE INVENTION

To solve the above problems, it is an objective of the present invention to provide an advertising method using software products in which a recording medium including a software program where advertisement of an advertisement sponsor is included in at least a portion of the software program is provided for free or at a reasonable price so that a user sees the advertisement during use of the software program.

Also, it is another objective of the present invention to provide an advertising method using software products in which a recording medium including a software program where advertisement of an advertisement sponsor is included in at least a portion of the software program is downloaded through the Internet for free or at a reasonable price so that a user sees the advertisement during use of the software program.

It is yet another objective of the present invention to provide an advertising method using software products in which a user using software programs including advertisement in the circumstances of being accessible to the Internet can access the home page of the advertisement sponsor by clicking on the advertisement linked thereto.

Accordingly, to achieve the above objectives, there is provided an advertising method using software products, wherein an advertisement is included in at least a part of a program of a software product supported by an advertisement sponsor, and a program user obtains the program for free or at low cost so that the user of the software product is forced to see the advertisement of the advertisement sponsor during use of the software program.

To achieve the above objectives, there is provided an advertising method using software products, wherein a software program included in a recording medium where an advertisement of an advertisement sponsor is included in at least a part thereof is downloaded from the Internet for free or at low cost so that a user uses the software program while watching the advertisement.

To achieve the above objectives, there is provided an advertising method using software products, wherein, when a software program including an advertisement in at least a part thereof is used, as the advertisement of an advertisement sponsor links to a web site such as the home page of an advertisement sponsor, the web site is easily accessed by clicking on the web site address.

To achieve the above objectives, there is provided an advertising method using software products, wherein an advertisement program is inserted in at least a part of a software program, and when a recording medium where the software program is stored is reproduced in a computer and a video/audio reproducing apparatus, the advertisement program inserted in at least a part of the software program is reproduced.

Here, the position of the advertisement is not limited and inserted in an arbitrary portion of the program to be reproduced, and in the case of a recording medium used in a computer, even when the operation of the program is completed on the Internet, a window including the advertisement can exist as another open window.

It is preferable in the present invention that an advertisement of a single advertisement sponsor can be included in a software product, advertisements of a plurality of advertisement sponsors can be included according to their portions of support, only an advertisement of a single advertisement sponsor or advertisements of a plurality of advertisement sponsors can be included according to their portions of support in a plurality of software products, financial portions of an advertisement support can be determined according to the number of distributed software products, and the financial portions of an advertisement support can be determined according to the number of downloads of the software products.

Thus, the present invention allows users to use software products supported by advertisement sponsors without a burden of the cost therefor so that use of developed software products is promoted and increased.

BRIEF DESCRIPTION OF THE DRAWINGS

The above objectives and advantages of the present invention will become more apparent by describing in detail a preferred embodiment thereof with reference to the attached drawings in which:

FIG. 5 is a flow chart for explaining the advertising method using software products according to the present invention which is executed on the Internet.

DETAILED DESCRIPTION OF THE INVENTION

Figure 1:
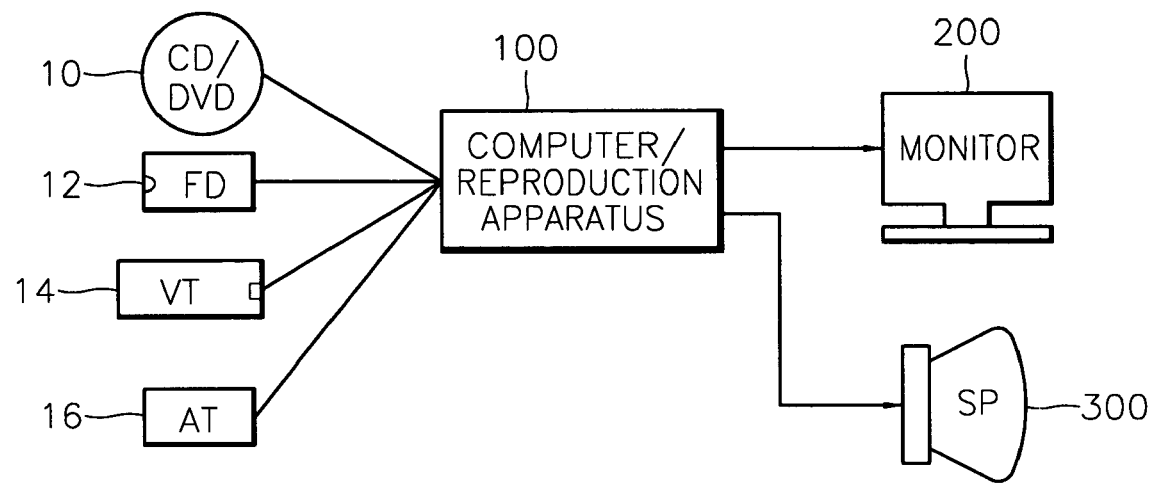
FIG. 1 is a block diagram showing the hardware environment where the present invention is applied.

As shown in FIG. 1, an advertising method of the present invention uses a compact disks (CD) or a digital versatile disk (DVD) 10, a floppy disk (FD) 12, a video tape (VT) 14, or audio tape (AT) 16, as a recording medium where an advertising program of an advertisement sponsor is included in at least a portion of a commercial software program. Thus, reproduction apparatuses for reproducing information recorded on the recording medium are determined according to the type of the recording medium and is indicated as a computer/reproduction apparatus 100 in FIG. 1. The CD/DVD 10 or the FD 12 is reproduced in a computer while the VT 14 and the AT 16 are reproduced in video tape recorders (VTRs or VCRs) and audio tape recorders, respectively. Among the reproduced data, image and text data are displayed through a monitor 200 and audio data is output through a speaker 300.

Figure 2A:
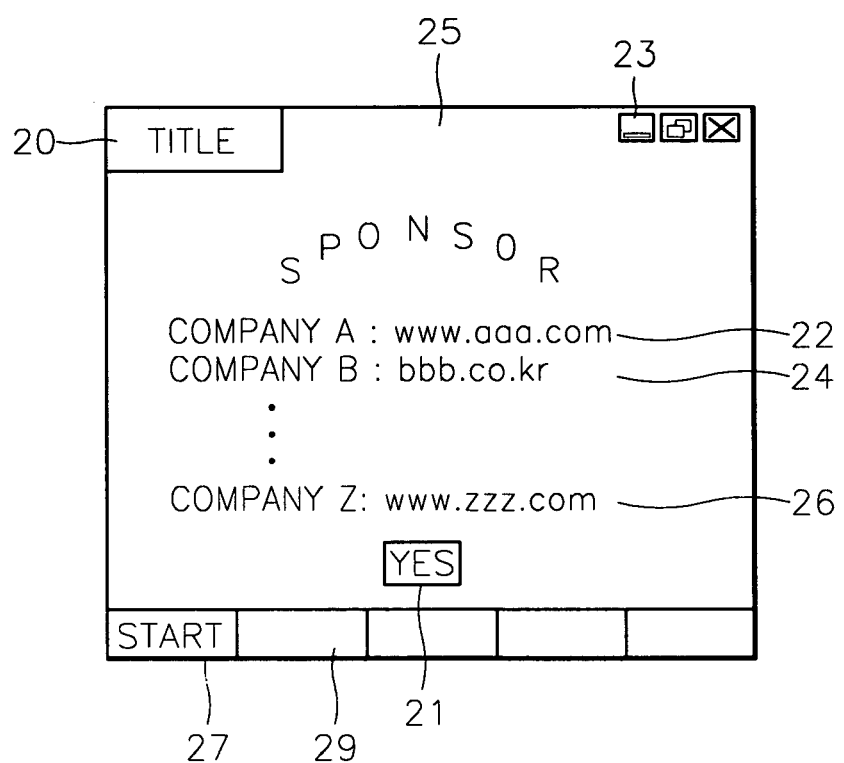
FIGS. 2A and 2B are views showing examples of displays on a screen when a software program according to the present invention is executed.
Figure 2B:
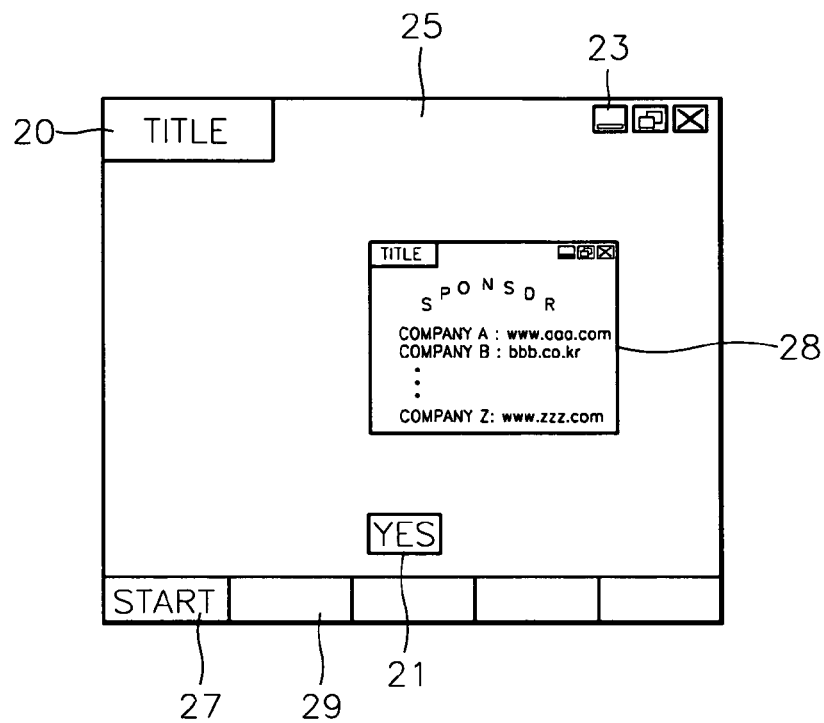

Thus, when a recording medium containing a software program where advertisement program is inserted at a portion of the recording medium is reproduced in the computer or video/audio reproduction apparatus 100, the advertisement program is reproduced on a screen 25 of the monitor 200 as shown in FIGS. 2A and 2B. FIG. 2A, showing an example of the screen 25 where the advertisement is displayed, displays an advertisement page displayed on the first screen when the software program product is executed. FIG. 2A shows the title 20 of the software program and names of advertisement sponsors 22, 24 and 26 with the addresses of their web sites. Here, when the web site of an advertisement sponsor is selected, the user is directly brought to the home page of the advertisement sponsor through the Internet. In this case, when a button indicated by reference number 23 is clicked on, the advertisement page is minimized and located on the task bar in an ordinary Windows environment, of which a detailed description will be omitted. Here, when a button indicated by reference numeral 21 is clicked on, a desired program is executed, and when a start button 27 is pressed, a desired job under the Windows environment can be designated. Here, the position where the advertisement program is recorded on the recording medium is not limited so that it can be inserted and reproduced at any arbitrary position of the program. Also, as shown in FIG. 2B, in the case of a recording medium used in a computer, as a window displaying the advertisement program remains as an open window while other programs are executed after the original program including the advertisement program is terminated, a user may easily access the information or the web sites linked by the advertisement while using the other program.

As an optional item in the present invention, as the advertisement sponsor wishes that a user of the software sees their advertisement more and more and the user tends to skip the advertisement page, to prevent this, the subsequent operations of the software can be executed only when the user clicks on a name icon or a web site icon of the advertisement sponsor in the advertisement page, or when the name of the advertisement sponsor is typed in the advertisement page. Also, the advertisement page can be displayed on the screen on which the software is displayed, as an open window, as many times as the advertisement sponsor wishes or at predetermined intervals.

Figure 3:
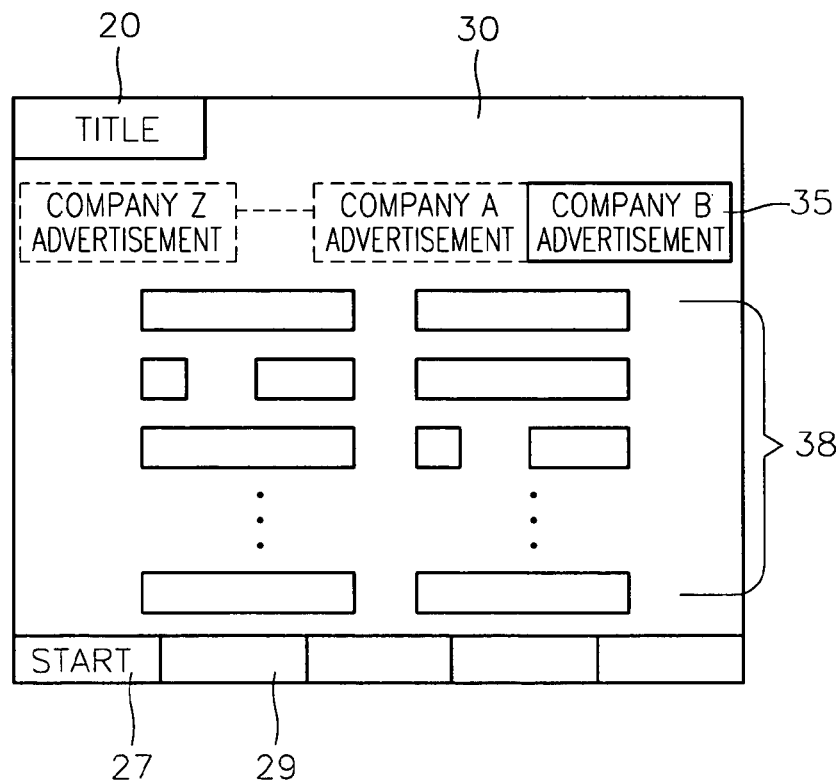
FIG. 3 is a view showing another example of a display on a screen when the software program according to the present invention is executed.

Also, as shown in FIG. 3, advertisement sites of the advertisement sponsors can be displayed in an advertisement program area 35 which is a part of an area 33 for execution of a program on a screen 30 while a commercial software product is executed. Here, the advertisement program area 35 may be a still image or moving picture and the advertisement program area can be included and displayed in the program title area 20. Thus, the user of the software program provided by the present invention sees the advertisement during use of the program as shown in FIGS. 2A, 2B and 3 so that the contents of the advertisement are directly transferred to the user.

In the present invention, only the advertisement of a single advertisement sponsor can be included in one software program, or the advertisements of multiple advertisement sponsors can be included in one software program according to their portions of support. Also, various kinds of software programs can include the advertisement of only one advertisement sponsor, or the advertisements of multiple advertisement sponsors can be included in one software program according to their portions of support. In this case, the financial portions of the advertisement can be determined according to the number of distributed software products. Also, according to the advertising method using software products of the present invention, anyone who desires to use the software products can download the software through the Internet or through a BBS (bulletin board system) for free or by pay. Here, the financial portions in supporting the advertisement can be determined according to the number of downloads of the software products. Thus, anyone who wishes to use the software products with support by the advertisement sponsors can use the software products without a financial burden so that use of the developed software is promoted and increased.

Figure 4:
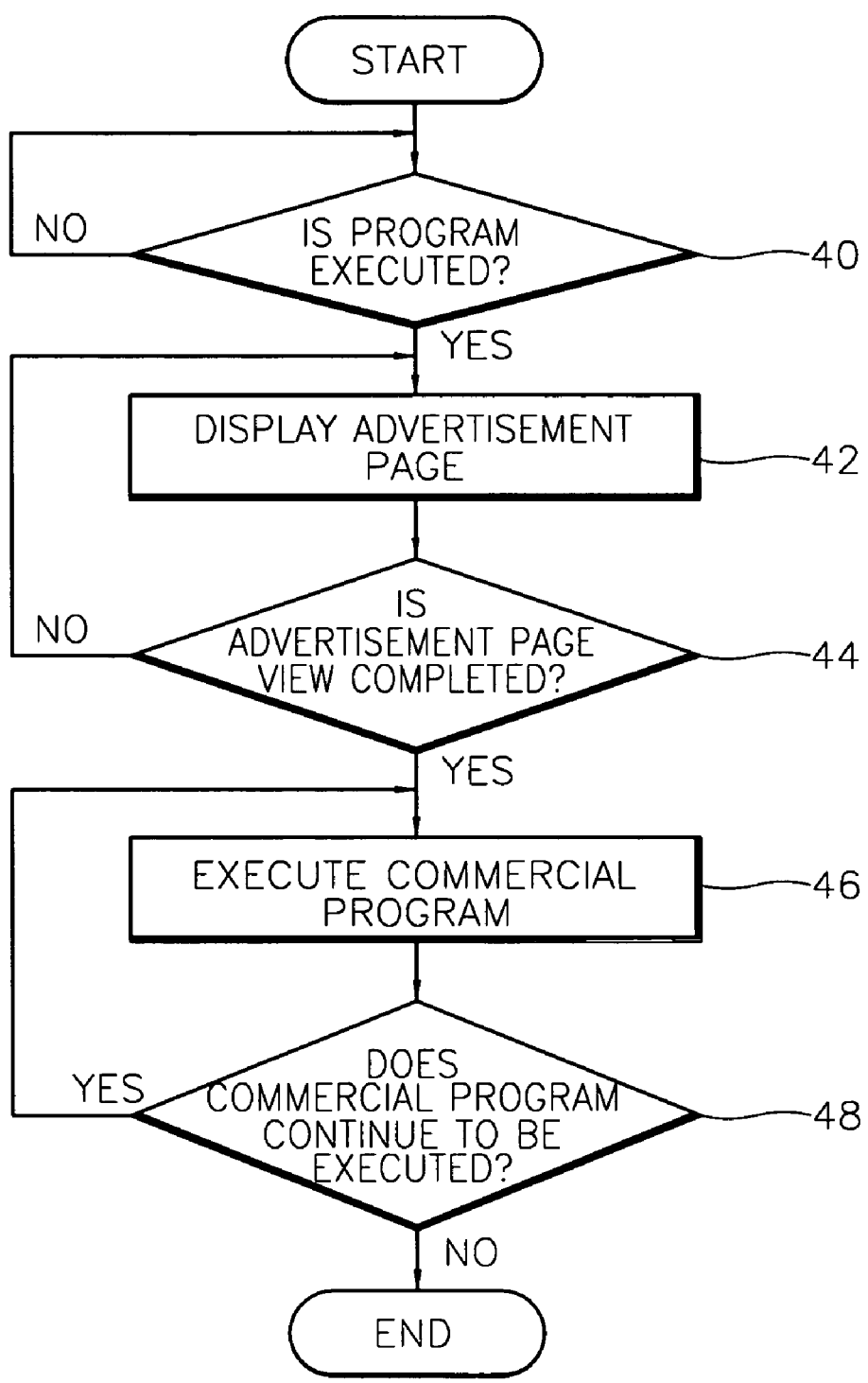
FIG. 4 is a flow chart for explaining the advertising method using software products according to the present invention.

The execution of the advertising method using software products according to the present invention will be described in detail with reference to FIGS. 4 and 5. FIG. 4 is a flow chart for explaining the execution of the advertising method using software products according to the present invention. Referring to FIG. 4, the advertising method using software programs according to the present invention includes a step 40 for determining whether a program is executed as a step in which a user obtaining a recording medium containing an advertisement program inserts the recording medium in a reproducing apparatus such as a computer to reproduce the advertisement program. When the program is not executed in step 40, the recording medium stands still in a ready mode in the reproducing apparatus until the program is executed. When the program is executed, the recording medium is reproduced and an advertisement page inserted in a commercial program is displayed on a screen in step 42. When the user watches the advertisement page in step 44, that is, an advertisement paper view is completed and a button for executing the next action is pressed, the process flows to step 46. When the advertisement page view is not completed, the system stands still until the advertisement page view is watched so that an effect of advertisement is raised. In step 46, the user executes a commercial program to carry out a job using the program. The commercial program is executed until the commercial program is terminated by the user. When the commercial program is terminated in step 48, the advertising method of the present invention is terminated. However, as described with reference to FIG. 2B, in the advertising method of the present invention, an advertisement information window 28 including the advertisement sites can be minimized on a task bar 29 of the screen 25 by clicking a button 23 of the window 28 so that the window 28 can be called anytime during use of other programs.

Also, FIG. 5 is a flow chart for explaining the execution of the advertising method using software program according to the present invention on the Internet. In FIG. 5, a user is connected to the Internet in step 50 and accesses the home pages of a software program to which the present invention is applied in step 52. If the user wants to download a desired software product through the Internet, that is, the user clicks a download button, the home page of the software product requests the user to register for download of the software product in step 54. The user downloads the desired software product through the Internet in step 56. Next, the user installs the downloaded software product on his/her computer in step 58. The software is executed to use the program in step 60. Then, through the same or similar steps to those shown in FIG. 4, the inserted software is reproduced and the user uses the program while watching the advertisement.

Thus, when the advertising method using software products according to the present invention is used, a program developer may induce advertisement from advertisement sponsor while the user can uses expensive programs for free or at low cost on the condition of being exposed to advertisement of the advertisement sponsor.

As described above, according to the advertising method using software products of the present invention, the efficiency of advertisement can be improved in view of the advertisement sponsor and the user can use expensive program for free or at low cost. Also, for a program developer, compensation for the development of the program may be made at an appropriate time so that he/she can devote himself/herself to development of improved programs.

What is claimed is:

1. An advertising method using software products in which at least one advertisement is inserted so that the software products can be distributed for free or at a low cost, the advertising method comprising the steps of:

inserting at least one advertisement into at least one portion of a software program contained in a software product during the making of the software product;

making the software program stop in operation during use of the software program when the inserted advertisement is displayed on a display screen; and resuming the software program only when the inserted advertisement displayed on the display screen is clicked on;

wherein the software program with the inserted advertisement is reproducible and operable without connecting to the Internet.

2. An advertising method of claim 1, further comprising the step of downloading a software program, where an advertisement of an advertisement sponsor is included in at least a part thereof, from the Internet for free or at low cost.

3. An advertising method of claim 2, wherein when a software program including an advertisement in at least a part thereof is used, as the advertisement of an advertisement sponsor links to a web site such as the home page of an advertisement sponsor, the web site is easily accessed by clicking on the web site address.

4. An advertising method of claim 1, wherein a window through which at least one advertisement is displayed can exist as another open window on the display screen.

* * * * *